United States Patent Office 3,462,952
Patented Aug. 26, 1969

3,462,952
ROCKET PROPULSION PROCESS USING IRRADIATED SOLID POLYMERIC PROPELLANT
Gaetano F. D'Alelio, South Bend, Ind., assignor to Dal Mon Research Co., Cleveland, Ohio, a corporation of Delaware
No Drawing. Filed Dec. 5, 1958, Ser. No. 778,304
Int. Cl. F23r 1/18; C06d 5/06; C06b 15/00
U.S. Cl. 60—219
47 Claims This invention relates to irradiated, crosslinked polymeric compositions. More specifically, it relates to such compositions adapted for use as a solid propellant fuel, and for various other purposes, such as fuel additives, flares, etc.

In the propelling of rockets and related devices, it is highly desirable that the fuel supplying the propellant force should be a solid fuel. The use of liquid or gaseous fuels requires containers generally capable of withstanding considerable pressures, as well as devices for feeding the fuel, all of which add considerable weight to the rocket. Moreover, with the fuel in a liquid state, there is considerable sloshing in the container, which causes shifting of weight and endangers directional control of the rocket. With solid fuels, however, the containing and feeding devices can be dispensed with or be simplified considerably and sloshing is avoided. In fact, the fuel can be used as its own container and as an insulating shield for the combustion zone.

The use of thermoplastic hydrocarbon resins for such purpose has the disadvantage that the portion of the resin in proximity to the flame or combustion zone is melted and either drips away or is blown away by the combustion gases. This results in a considerable loss of the B.t.u. value of the fuel.

It has been proposed to use thermoplastic rubber to give the fuel its desired shape and then, after the desired modifiers have been added, the rubber is vulcanized to remove the thermoplastic properties. However, vulcanization requires undesirable conditions, such as increased temperature, and the addition of undesirable vulcanizing agents. Moreover, with such rubber compositions, there is undesirable channeling during the combustion.

In accordance with the present invention, it has now been found that compositions many of which are particularly useful as solid propellant fuels can advantageously be made of high molecular weight hydrocarbons consisting of at least 15% aliphatic hydrocarbon, preferably more than 50%, such as for example, polymeric hydrocarbons, rubber, paraffin, etc., hereinafter sometimes referred to as base material, in which boron, aluminum, beryllium, or magneisum metal, their hydrides, or hydrocarbon derivatives thereof have been mixed, and which, with or without the addition or incorporation of modifiers, are irradiated to produce reaction between the metal component and the hydrocarbon. Crosslinking of the polymeric or paraffin materials occurs simultaneously. As described more fully hereinafter, non-dripping, non-melting fuels can be made by the practice of this invention. The preferred base materials are the aliphatic hydrocarbons, advantageously those having a high hydrogen-to-carbon ratio. The presence of various polyunsaturated crosslinking modifiers, such as listed hereinafter, is most advantageous in that it facilitates the crosslinking and permits the use of much smaller doses of irradiation to produce the desired effects.

The fuel composition also preferably has incorporated therein oxidizing agents of a solid or liquid type which will either sustain the combustion itself or at least will supplement the action of an independent oxidizing fluid being passed in contact with the fuel. Such materials as ammonium perchlorate, potassium perchlorate, ammonium nitrate, etc., can be incorporated for this purpose. However, when such oxidizing agents are not present in the composition, the composition can be used as fuel or as a fuel supplement in various manners described hereinafter, using highly concentrated oxygen, fluorine, concentrated hydrogen peroxide, fuming nitric acid, perchloryl fluoride, air, etc.

The compositions prepared by the practice of this invention have excellent burning and thrust properties. It is surprising that these compositions, particularly those containing most reactive materials, such as metal hydrides and their hydrocarbon derivatives, as well as various oxidants, can be safely irradiated. Furthermore, while it is not intended to restrict the invention to such interpretation, it appears that to some extent at least the metal, as well as the hydrides and their derivatives, are grafted to the base material since the color of the flame upon ignition is more characteristic of the combustion of a metal alkyl than of a metal per se.

When a composition of this invention is used as a solid propellant fuel, the fuel is advantageously made in the form of a solid rod or elongated cylinder with an opening running along the axis of the rod in such a manner that an oxidizing agent or resulting combustion gases can be passed through the opening so that the rod is burned from the inside surfaces. However, the fuel can be used in various other manners also, including powder and other solid shapes.

The base materials used in the compositions of this invention are high molecular weight materials having molecular weights over 300, and preferably over 3,000. These materials are hydrocarbons and contain at least 15%, preferably more than 50% of aliphatic hydrocarbon. Since the hydrogen-to-carbon ratio in aliphatic hydrocarbons is higher, and since some of the irradiation is dissipated in the aromatic rings, aliphatic hydrocarbons are preferred.

Various base materials that can be used in the practice of this invention include polymeric hydrocarbons, rubber, either natural or any of the various synthetic hydrocarbon types and preferably unvulcanized or thermoplastic types, paraffin, etc. Examples of polymeric hydrocarbons that can be used include, but are not restricted to, polymeric olefins, such as: polyethylene, polypropylene, polybutene-1, polyisobutylene, polypentene-1, polymeric 2-methylbutene-1, polymeric 3-methyl-butene-1, polymeric octene-1, polymeric butadiene, polymeric isoprene, etc.; polymeric alkenyl aryl compounds, such as polystyrene, polymeric alpha-methyl-styrene, polymeric vinyl naphthalene, polymeric isopropenyl naphthalene, polymeric vinyl diphenyl, polymeric isopropenyl-diphenyl, various nuclear-alkyl derivatives of these such as polymeric ethyl styrene, polymeric vinyl toluene, etc.

While it is generally preferred that the base materials used in the practice of this invention are thermoplastic, it is also possible to use thermoset or thermosettable materials, provided they are in a form, such as finely divided powder, that will allow intimate contact with the metal or metal compound. For that reason also, thermoplastic rubber is preferred over the vulcanized type, particularly where the vulcanizing agent has a high proportion of non-hydrocarbon material in it.

Thermoplastic rubbers than can be used in the practice of this invention include: unvulcanized natural rubber and various types of synthetic rubbers, including those made by polymerization or copolymerization of 1,3-dienes by themselves, or in mixture with each other, or with other compounds, such as styrene, various styrene derivatives, isobutylene, etc. Typical dienes used for this purpose include: butadiene, isoprene, 2,3-dimethylbutadiene, etc. The various kinds of rubbers used include the various types, such as the butyl-rubber type, those made by the so-called cold rubber method, those made by the sodium-catalyzed process, etc.

Paraffins suitable for use in the practice of this invention can be derived from various sources, for example, from petroleum, lignite, brown coal, and synthetic sources. Petroleum waxes generally have melting points between 50° C. and 60° C. and contain hydrocarbons essentially in the range of $C_{23}$ to $C_{35}$, or higher. Minor amounts of lower molecular weight and higher molecular weight materials are found in such compositions. Synthetic paraffin and paraffin from other sources have been found to contain hydrocarbons as high as $C_{57}$, for example, from wax of certain crude oils. Some of these have melting points as high as 80° C., or higher. Lignite paraffin has melting points ranging from about 35° C. to 62° C., those melting below 50° C. being known as soft paraffin, and those melting above 50° C. being referred to as hard paraffin. Paraffin from these various sources can be used in the practice of this invention.

Since paraffin irradiated by itself does not produce sufficient crosslinking with practical amounts of irradiation to render it infusible, it is necessary when it is desired to produce infusible products to have present in the paraffin compositions of this invention, at least 0.1%, preferably 1% or more of one or more crosslinking agents of the type described herein, based on the weight of base material. However, valuable products can be produced from paraffin by the practice of this invention even without such crosslinking modifiers, particularly where it is desirable to produce soluble products, for example, for use as fuel additives, liquid fuels, etc. Crosslinked, infusible products can be made from the polymeric materials but the presence of the polyunsaturated modifiers facilitates crosslinking and permits the use of much lower irradiation dosages.

Methods of making the polymers used in the practice of this invention are well-known. Copolymers as well as polymers can be used, providing the comonomers do not give undesirable properties in the ultimate uses and also do not lower considerably the B.t.u. value of the fuel. In view of the fact that the molecular weight is increased by the irradiation, polymers of very low molecular weight, for example 3,000 and even as low as 300, can be used, and in view of the relative softness, which facilitates admixture with oxidizing agents, are sometimes preferred in the practice of this invention. There is no upper limit to the molecular weight of the polymers that can be used in the practice of this invention.

The metal hydrides and hydrocarbon derivatives thereof used in the practice of this invention are preferably those which are liquid or solid at room temperature. The corresponding gaseous compounds require the use of solvents, special containers, etc., and therefore the liquid and solid materials are preferred. Typical compounds of this type include, but are not limited to, the following: pentaborane, hexaborane, decaborane, triethyl borane, tripropyl borane, tributyl borane, triamyl borane, trihexyl borane, tri-octyl borane, tri-decyl borane, tri-tetradecyl borane, tri-cyclohexyl borane, triphenyl borane, triphenethyl borane, trimethyl diborane, tetramethyl diborane, symmetrical dipropyl diborane, unsymmetrical dipropyl diborane, tripropyl diborane, tetrapropyl diborane, trimethyl triborane, tetramethyl triborane, hexamethyl triborane, tetraethyl tetraborane, hexaethyl tetraborane, 1-n-butyl-boracyclohexane, 1-n-butyl-boracyclopentane; aluminum hydride in its various polymeric forms $(AlH_3)_x$, dimethyl aluminum hydride, diethyl aluminum hydride, dipropyl aluminum hydride, dibutyl aluminum hydride, dipentyl aluminum hydride, diphenethyl aluminum hydride, dicyclohexyl aluminum hydride, methyl aluminum dihydride, ethyl aluminum dihydride, propyl aluminum dihydride, butyl aluminum dihydride, pentyl aluminum dihydride, phenethyl aluminum dihydride, 2-ethyl-hexyl aluminum dihydride, cyclohexyl aluminum dihydride, cyclopentyl aluminum dihydride, cyclohexylethyl aluminum dihydride, cyclopentylethyl aluminum dihydride, trimethyl aluminum, triethyl aluminum, tripropyl aluminum, tributyl aluminum, triisobutyl aluminum, tripentyl aluminum, tri-(2-ethyl-hexyl)-aluminum, tri-phenethyl aluminum, tri-benzyl aluminum, tri-(2-decyl-tetradecyl)-aluminum, triphenyl aluminum, tritolyl aluminum, tetramethyl dialuane, trimethyl dialuane, pentamethyl dialuane, symmetrical diethyl dialuane, tetraethyl dialuane, pentaethyl dialuane, etc.; beryllium hydride, ethyl beryllium hydride, propyl beryllium hydride, butyl beryllium hydride, octyl beryllium hydride, nonyl beryllium hydride, styryl beryllium hydride, cyclohexyl beryllium hydride, phenyl beryllium hydride, diethyl beryllium, methyl ethyl beryllium, dipropyl beryllium, dibutyl beryllium, ethyl butyl beryllium, diamyl beryllium, dioctyl beryllium, distyryl beryllium, methyl phenyl beryllium, dicyclohexyl beryllium, ethyl cyclohexyl beryllium, dicyclopentyl beryllium, etc.; magnesium hydride, ethyl magnesium hydride, propyl magnesium hydride, butyl magnesium hydride, octyl magnesium hydride, nonyl magnesium hydride, styryl magnesium hydride, cyclohexyl magnesium hydride, phenyl magnesium hydride, diethyl magnesium, methyl ethyl magnesium, dipropyl magnesium, dibutyl magnesium, ethyl butyl magnesium, diamyl magnesium, dioctyl magnesium, distyryl magnesium, methyl phenyl magnesium, dicyclohexyl magnesium, ethyl cyclohexyl magnesium, dicyclopentyl magnesium, etc.

While the reaction between the metal and the hydrocarbon promoted by the practice of this invention will proceed to some degree regardless of the size of the metal particles used, it is preferred to use very finely divided metal particles, for example, submicronic size, so as to present as much area as possible for surface reaction. This is also true when the hydride or hydrocarbon-substituted metal hydride is in the solid form. Various types of known equipment can be used to prepare such particles, an inert atmosphere being advantageously used in all cases.

The metal content of the mixtures used in the practice of this invention, regardless of whether it is metal per se or a compound of the metal, should be at least one percent by weight based on the combined weight of metal composition and base material plus crosslinking modifier. Especially where the product is to be used for fuel purposes, the metal content is desirably much higher than this and very often is about 60% by weight. In some cases it might be desirable to have as much as 75% of metal in such compositions but it is generally not necessary to have more than about 60% metal, particularly where the hydrocarbon portion is to serve also as the carrier for an oxidant. The mixing of the ingredients can be carried out in Banbury mixers, rolling mills, ball mills, compounding and blending extruders, etc. For the exposure to irradiation, the mixture is advantageously wrapped or sealed in polyethylene or nylon film, aluminum or other metal foil, glass containers, etc., or tumbled in powder form in an inert atmosphere.

While the base materials can be used as such in this invention, it is generally advantageous to use a crosslinking modifier in these materials which will facilitate and increase molecular crosslinking. Thus, the amount of irradiation required to produce the desired effects in the material can generally be decreased. Moreover, temperature increases can thereby be more easily avoided or controlled.

The use of irradiation to produce the crosslinked character of these compositions and resultant infusibility therein, permits lower temperatures in the manufacturing process and avoids adverse effects on the various oxidizing agents which may be incorporated in the fuel. Since the crosslinking effected hereby does not require high temperatures, this invention permits the incorporation of high proportions of oxidizing agents that are unstable at temperatures normally used to effect crosslinking. Moreover, the material can be precooled and periodically recooled during preparation without adversely affecting the crosslinking operation. Moreover, the product of this invention when used as a rocket fuel does not result in channeling and serves as a good insulation shield for the combustion zone.

While other types can also be used, the crosslinking modifiers used in the practice of this invention advantageously are: polyalkenyl aryl compounds, i.e. divinyl benzene, diallyl naphthalene, diisopropenyl diphenyl, etc. However, polyunsaturated aliphatic and cycloaliphatic hydrocarbons can also be used for this purpose, such as: butadiene, isoprene, cyclopentadiene, vinyl cyclohexene, cyclohexadiene, etc. While these latter compounds may not be as efficient in some cases for this purpose as the dialkenyl aryl compounds, they have the advantage of a higher hydrogen-to-carbon ratio which is desirable, especially when used in large amounts. Hydrocarbon materials are preferred as crosslinking modifiers, but various other types of compounds can be used for this purpose when used in small proportions. Such compounds can include minor amounts of oxygen, sulfur, nitrogen, etc., such as polyunsaturated esters, ethers, sulfides, amides, amines, etc., and combinations thereof. When modifiers are used containing such groups, it is desirable to have the modifier mixed with the base material before the metal composition is added so as to reduce the possibility of reaction therewith.

It is generally desirable that the fuel be molded in the shape in which it is ultimately to be used before the composition is irradiated. In fact, the fuel can be cast or molded as one entire unit which will comprise the entire fuel load for one rocket and can be usbstantially as long as the rocket if desired. Therefore, the size is limited only by the size of the rocket in which it is to be used.

It is possible to make the fuel in other shapes than indicated above and have the irradiated fuel machined to give the desired shape. For example, cylindrical shapes are generally desirable with an opening running through the cylinder along its linear axis. If desired there can be a plurality of such openings running through the length of the mass so that more than one oxidizing stream can function simultaneously. However, various other shapes can be used, such as blocks having rectangular or square cross sections with one or more openings running along the linear axis of the block.

While the aforementioned shapes are preferred, it is also possible to use smaller units or shapes made by the practice of this invention, and then to assemble them in a space or container in such a manner that one or more linear paths are left through the assembled mass so that the oxidizing gas and/or the combustion gases can be passed therethrough. For example, the fuel can be in the shape of discs with an opening in the center, or in half or quarter discs, or even with rectangular, square, or various other cross-sections so that upon assembly, one or more openings for the oxidizing gas are formed through the assembled mass. Sometimes to accommodate the irradiation equipment a cylindrical mass can be made of a number of concentric cylinders for which the outer diameter of one is slightly less than the diameter of the inside linear openings of another so that the assembled cylindrical mass actually comprises a number of cylindrical sleeves which fit over one another. The axial opening of the one having the smallest diameter would be the linear axis opening of the assembled mass.

In any case, however, the desired modifiers are added before irradiation. For example, the auxiliary oxidizing agents, such as the ammonium and potassium perchlorates and nitrates, should be added before irradiation. These are desirably in fine particle size so as to permit substantially uniform distribution throughout the mass. The oxidizing composition which is to be passed through the center opening is of the type generally used presently, such as pure or highly concentrated oxygen. The upper limit in the amount of oxidizing agent to be used is determined by the concentration that can safely be used under the conditions ultimately existing in the fuel zone of the rocket, or by that excess over the stoichiometric amount required for complete combustion of the fuel, whichever limit is reached first. Obviously, the safety limit will vary according to the type of auxiliary oxidizing agent used, the type of fuel base material used together with its heat capacity and heat transmission properties, the temperature which will exist in the preparation and use of the fuel, etc.

Since the fuel composition of this invention can be used according to various methods, varying from that in which the entire amount of oxidizing agent is supplied from the fluid pumped through the liner opening to that in which the combustion is self-sustained by the oxidizing compound contained in the fuel, the minimum amount of such oxidizing agent contained in the fuel will depend on the manner in which the fuel is to be used. When the combustion is to be maintained partly by an oxidizing agent in the fuel and partly by the oxidizing agent pumped through the opening, then obviously the supplemental effect of one agent toward the other will depend on the particular material being used as the oxidizing agent in the fuel and on the particular oxidizing fluid being fed through the opening.

Moreover, in each case the relative amounts cannot be determined on a weight basis but must be determined on the basis of the amount of oxygen available in the particular oxidizing agent used to support the combustion. This depends on the oxygen content of the oxidizing agent and the percent of that oxygen that is liberated for oxidizing purposes upon decomposition of the oxidizing agent. Furthermore, this depends somewhat on the efficiency with which it is desired to consume the fuel. For example, it might be desirable to have a considerable excess of oxidizing agent so as to consume the fuel more completely, even though it might mean an inefficient use of the oxidizing agent. Again, if it is permissible to use the fuel with a low efficiency for use of B.t.u. content, then it may be desirable to use a smaller amount of oxidizing agent.

The amount of oxidizing agent imbedded in the fuel itself can be further decreased when a supplemental oxidizing fluid is being pumped through the linear opening. Obviously, therefore, the proportion of oxidizing agent imbedded in the fuel base material can vary from zero to approximately 95% depending on the various factors involved, such as the efficiency desired, the method and convenience of operation, and the materials being used. Generally, when an oxidizing agent is imbedded in the base material, it is advantageous to use from 1%, preferably 5%, to about 80% based on the combined weight of the oxidizing agent, base material, metal powder or metal compound, and any crosslinking modifier that is used.

When an oxidizing agent is used in the fuel base material of the type and in the amount that will be self-sustaining in the combustion of the fuel base material, there will be no need to flow an oxidizing fluid through the opening of the fuel. In such cases, the combustion of the fuel is initiated by igniting with various compositions as are presently used for that purpose, such as a mixture of hydrazine, or unsymmetrical dimethyl hydrazine and nitric acid, or by triethyl aluminum and oxygen, or by a torch, or by an electrical ignition system. When an oxidizing agent is not present in the fuel, or is not of the self-sustaining type, liquid oxygen or an efficient oxidizing compound such as perchloryl fluoride ($FClO_3$) can be pumped into the opening to supply the oxygen for combustion. In some cases highly concentrated hydrogen peroxide, such as 98% hydrogen peroxide, can be used to supply oxygen for combustion.

When a self-sustaining oxidizing agent is distributed throughout the fuel, the desirable amount can be determined by calculating the stoichiometric equivalent required for combustion of the fuel, and adjusting the calculation by subtracting where less than 100% efficiency is satisfactory or adding where desired, an excess to compensate for the lack of 100% efficiency in the actual combustion. Since the conditions of operation do not permit the time and type of mixing which give 100% efficiency, where other factors permit it is sometimes desirable to have an excess of oxidizing agent which will give 50%, or even as high as 100% more than the stoichiometric amount of oxygen. When it is permissible or desirable to sacrifice some of the efficiency of the B.t.u. content of the fuel, the stoichiometric amount or even less than that amount of the oxidizing agent can be used, depending on the fuel efficiency desired.

The auxiliary oxidizing agent and/or modifier can be introduced or suspended in the solid fuel in any convenient or appropriate manner. The mixture can be effected mechanically as on mixing mills, on a Banbury mixer, any single or double worm extruder, or by rotation of the mold when the material is being cast from a liquid state. When a solid is to be added, the thermoplastic material can desirably be softened by the addition of a softening agent or, as indicated above, by the modifier itself. Such compounded mixtures can then be extruded, or otherwise shaped into the desired form, and then irradiated. However, whichever method of mixing is used, it is desirable to avoid the generation of heat that will raise the temperature to the ignition point of the oxidizing agent. Therefore, in some cases it is desirable to precool the materials to be mixed or to provide means to withdraw the heat as it is generated.

Other oxidizing agents which can be incorporated in accordance with safety conditions determined by their reactivity are solid and liquid perchloryl aryl compounds of the formula $Ar\text{-}ClO_3$, such as perchloryl benzene, etc., ammonium persulfate, potassium permanganate, manganese dioxide, potassium iodate, potassium nitrate, potassium dichromate, chloric acid, perchloric acid, etc. Some of these are not self-sustaining oxidizing agents, and can be used when free oxygen, or compositions such as perchloryl fluoride, highly concentrated hydrogen peroxide, etc., which generate oxygen in situ, are passed through the linear opening. The liquid oxidizing agents can be incorporated with precautions to assure uniform distribution through the polymer mass and to avoid ignition or explosive conditions during preparation and use of the fuel.

The term "irradiation," as used herein, means high energy radiation and/or the secondary energies resulting from conversion of this electron energy to neutron or gamma radiation, said electron energies being at least about 100,000 electron volts. While various types of irradiation are suitable for this purpose, such as X-ray and gamma and beta rays, the radiation produced by high power electron linear accelerators has been found to be very conveniently and economically applicable and to give very satisfactory results. However, regardless of the type of irradition and the type of equipment used for its generation or application, the use thereof in the treatment of polymeric materials as described herein is contemplated as falling within the scope of this invention so long as it is produced by or from electron energy of at least about 100,000 electron volts. While there is no upper limit to the electron energy that can be so applied advantageously, the effects desired in the practice of this invention can be accomplished without having to go above 50,000,000 electron volts. Generally, the higher the electron energy used, the greater is the depth of penetration into the massive structure of polymeric materials, and the shorter is the time of exposure required to accomplish the desired result. For other type of irradiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van de Graaff generators, betatrons, synchrotrons, cyclotrons, etc. Neutron radiation can be produced by bombarding a selected light metal such as beryllium with positive particles of high energy. Particle radiations can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to radiations of this type, commonly called X-ray, an ionizing electromagnetic radiation suitable for the practice of this invention can be obtained by means of a nuclear reactor (pile) or by the use of natural or synthetic radioactive material, for example Cobalt 60.

Various types of high power electron linear accelerators are commercially available, for example from Applied Radiation Corporation, Walnut Creek, California. In the following Example I, ARCO type travelling wave accelerator, model Mark I, operating at 3 to 10 million electron volts, was used to supply the irradiation. Other type of accelerators, such as supplied by High Voltage Engineering Corporation, Burlington, Massachusetts, or as described in United States Patent No. 2,763,609 and in British Patent No. 762,953 are satisfactory for the practice of this invention.

In the following examples, the radiation doses are reported in megareps, which represent 1,000,000 reps. A "rep" is defined according to "Reactor Shielding Design Manual" edited by Theodore Rockwell III and published by D. Van Norstrand Company, Inc., 1st edition, 1956, as that radiation dosage which produces energy absorption in human tissue equal to 93 ergs per gram of tissue.

In the practice of this invention, changes in properties of the materials can often be noted after treatment with even less than 1 megarep. However, it is generally advantageous to use doses of 2 megareps or more. The degree of change in properties is dependent somewhat on the dosage, greater changes being effected by increasing the dosage.

The material to be treated is often advantageously irradiated while in a container made of a material such as aluminum or glass which will not substantially interfere with the irradiation. It is advantageous also to use polymeric materials, such as polyethylene, nylons, i.e. 66 nylon, polycaprolactam, etc. It can also be wrapped in film or foil impervious to vapors and gases, such as aluminum foil, polyethylene film, etc., which will prevent substantially the escape of volatile materials. It is most advantageous to avoid oxidation or side reactions by the use of an inert atmosphere such as nitrogen. Moreover, it is advantageous to prevent the temperature from approaching that at which the material is unstable. This can be accomplished by cooling the material before irradiation, for example with Dry Ice, or by dissipating the heat generated during irradiation.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight. Unless indicated otherwise the terms "polymers" and "polymeric" are intended to include "copolymers" and "copolymeric." Molecular weights given herein are Staudinger molecular weights.

Example I

Fine divided polyethylene powder is thoroughly mixed on a Banbury mixer with 5% by weight of finely divided boron metal under an atmosphere of nitrogen. The resultant mixture is extruded under nitrogen into a cylindrical shape having 3 inches outside diameter and one inch opening along its linear axis. This cylinder is wrapped under a nitrogen atmosphere with polyethylene film to exclude air and is exposed to 35 megareps of irradiation from a linear accelerator as described above. The resultant product is used satisfactorily in a rocket with liquid oxygen fed through the opening in the cylinder and gives a very good thrust.

Example II

The procedure of Example I is repeated with similar results using Cobalt 60, X-ray, irradiation from a Van de Graaff generator, and bombarded beryllium, respectively.

Example III

The pocedure of Example I is repeated with similar results using 10% of finely divided aluminum, beryllium, and magnesium, respectively, in place of the boron.

Example IV

The procedure of Example I is repeated a number of times using the materials, concentrations, and variations indicated in Table I. Except where indicated otherwise in this table, as well as in other examples, the irradiation is provided by a linear accelerator as in Example I. In each case the product shows satisfactorily results when tested in a rocket as in Example I, and also when tested with fluorine as the oxidizing agent.

TABLE I

| Base material | Metal or metal compound | Percent by weight | Irradiation megareps (type) |
|---|---|---|---|
| Polyethylene | Tributyl B | 35 | 30 |
| Do | Tributyl Al | 25 | [1] 30 |
| Do | Dipropyl Be | 20 | [2] 30 |
| Do | Dipropyl Mg | 25 | 30 |
| Do | Pentaborane | 30 | 25 |
| Do | Aluminum hydride | 15 | 25 |
| Do | Be hydride | 10 | [3] 25 |
| Do | Mg hydride | 12 | 25 |
| Polypropylene | B | 20 | 35 |
| Do | Be hydride | 10 | 30 |
| Polybutene-1 | Al | 20 | 50 |
| Do | MgH$_2$ | 15 | [2] 40 |
| Polystyrene | Be | 25 | 30 |
| Polyethylene | Decaborane | 60 | 30 |
| 50% polyethylene, 50% polystyrene | Mg | 5 | [1] 30 |
| Polyethylene | Diethyl Al hydride | 10 | 20 |
| Polystyrene | B | 10 | 60 |
| 25% styrene, 75% butadiene copolymer | B | 15 | 35 |
| Do | Al | 12 | [1] 35 |
| Do | Mg | 15 | [2] 35 |
| Do | Be | 10 | 35 |
| Do | Triethyl boron | 15 | 30 |
| Do | Triethyl aluminum | 15 | [3] 30 |
| Do | Diethyl Mg | 10 | 30 |
| Do | Diethyl Be | 10 | 30 |
| Polyvinyl cyclohexane | Decaborane | 25 | 25 |
| Do | Aluminum hydride | 5 | 25 |
| Polybutadiene | Be hydride | 5 | [4] 25 |
| Do | Mg hydride | 5 | 25 |
| Natural rubber | B | 15 | 30 |
| Do | Al | 15 | 30 |

[1] X-ray.
[2] Cobalt 60.
[3] Van de Graaff.
[4] Bombarded beryllium.

Example V

The mixtures indicated in Table II below are prepared on a Banbury mixer under an atmosphere of nitrogen, the solids being used in finely divided form. The base material is first divided into two approximately equal portions, one portion being uniformly mixed with the metal composition and the other with the liquid or solid oxidant. Then the two resultant mixtures are combined and intimately mixed to give uniform distribution of the various components. The resulting mixture is then extruded under nitrogen to a cylindrical shape and further treated as in Example I, the irradiation dosages and sources being as indicated in Table II. In each case the product, upon testing, shows excellent burning and thrust properties.

TABLE II

| Base Material | | Metal or metal compds. | | Oxidant | | Irradiation megareps (type) |
|---|---|---|---|---|---|---|
| Type | Parts | Type | Parts | Type | Parts | |
| Polyethylene | 19 | Boron | 1 | Ammonium perchlorate | 80 | 30 |
| Do | 18 | Aluminum | 2 | Potassium perchlorate | 80 | 30 |
| Do | 20 | Magnesium | 5 | Perchloryl benzene | 75 | 30 |
| Do | 20 | Beryllium | 10 | Ammonium nitrate | 70 | [1] 30 |
| Do | 15 | Triethyl B | 15 | Potassium nitrate | 70 | 25 |
| Do | 15 | Tributyl Al | 15 | Ammonium perchloratz | 75 | 25 |
| Do | 15 | Diethyl Be | 10 | ...do... | 75 | [2] 35 |
| Do | 15 | Diethyl Mg | 10 | ...do... | 75 | 35 |
| Do | 20 | Decaborane | 30 | ...do... | 50 | 35 |
| Do | 20 | Al hydride | 10 | ...do... | 70 | [3] 40 |
| Do | 15 | Be hydride | 5 | Potassium perchlorate | 80 | 40 |
| Do | 20 | Mg hydride | 5 | ...do... | 75 | 40 |
| Polypropylene | 20 | Boron | 5 | ...do... | 75 | [4] 40 |
| Do | 15 | Triethyl Al | 5 | ...do... | 80 | 50 |
| Polybutene-1 | 20 | Mg | 5 | ...do... | 75 | 50 |
| Do | 18 | Be hydride | 7 | ...do... | 75 | 50 |
| Polystyrene | 20 | Triethyl A | 5 | ...do... | 75 | 60 |
| 25% styrene, 75% butadiene copolymer. | 15 | Boron | 5 | ...do... | 80 | 20 |
| Polybutadiene | 20 | Al | 5 | ...do... | 75 | 15 |
| Polyvinyl cyclohexane | 20 | Diethyl Be | 5 | ...do... | 75 | 30 |
| Gutta percha | 20 | Diethyl Mg | 5 | ...do... | 75 | 30 |

[1] Cobalt 60.
[2] X-ray.
[3] Van de Graaff.
[4] Bombarded beryllium.

Example VI

The procedure of Example I is repeated using the processing is performed as in Example I using the irvarious polymeric materials indicated in Table III and mixing the indicated crosslinking modifier with the base material before the metal composition is added. The various solid materials are in freely divided form. The radiation dosages and sources indicated in Table III. Excellent results are obtained upon testing as in Example I when using liquid oxygen and fluorine respectively as the oxidizing agents.

Example VII

The procedure of Example V is repeated using 100 parts of polyethylene in which the crosslinking modifier has been intimately mixed therewith prior to its division into two approximately equal portions for further processing as in Example V, using the ingredients, proportions, and irradiation dosages indicated below in Table IV. In each case the product shows excellent burning properties and propellant thrust when ignited.

TABLE III

| Base material | | Metal or metal compd. | | Modifier | | Irradiation megareps (type) |
|---|---|---|---|---|---|---|
| Type | Parts | Type | Parts | Type | Parts | |
| Polyethylene | 63 | B | 35 | Divinyl benzene | 2 | 10 |
| Do | 55 | Tributyl B | 35 | ...do... | 10 | 5 |
| Do | 60 | Triethyl Al | 30 | 50% Divinyl benzene, 50% ethyl styrene. | 5 | 15 |
| Do | 70 | Dipropyl Be | 20 | Vinyl cycl. hexene | 10 | 10 |
| Do | 65 | Triphenyl B | 25 | Diallyl | 10 | [1] 15 |
| Do | 40 | Decaborane | 55 | ...do... | 5 | 15 |
| Do | 50 | Diethyl AlH | 45 | ...do... | 5 | 15 |
| Polypropylene | 75 | B | 20 | ...do... | 5 | 10 |
| Do | 85 | BeH$_2$ | 10 | Divinyl benzene | 5 | [2] 15 |
| Polybutene-1 | 75 | Al | 20 | ...do... | 5 | 10 |
| Polyisobutylene | 80 | MgH$_2$ | 15 | Divinyl naphthalene | 5 | 20 |
| Polybutadiene | 90 | BeH$_2$ | 8 | Divinyl diphenyl | 2 | 5 |
| Polystyrene | 85 | B | 10 | Butadiene | 5 | [3] 25 |
| 50% polyethylene, 50% polystyrene | 95 | Mg | 5 | Divinyl benzene | 5 | 15 |
| 50% polyethylene, 50% paraffin | 87 | Al | 10 | Ethylene diacrylate | 3 | 20 |
| 50% polystyrene, 50% paraffin | 92 | B | 5 | Divinyloxy benzene | 3 | [4] 20 |
| 25% polyvinyl naphthalene, 75% paraffin | 85 | Triethyl B | 10 | Divinyl benzene | 5 | 15 |
| Paraffin | 80 | Triethyl Al | 5 | ...do... | 15 | 15 |
| Do | 80 | Al hydride | 5 | Diallyl | 15 | 20 |
| Do | 80 | B | 10 | ...do... | 10 | 25 |
| Do | 75 | Al | 15 | Divinyl benzene | 10 | [1] 20 |
| Do | 70 | Mg | 25 | ...do... | 10 | 20 |
| Do | 50 | Decaborane | 40 | ...do... | 10 | 20 |

[1] X-ray.
[2] Cobalt 60.
[3] Van de Graaff.
[4] Bombarded beryllium.

TABLE IV

| Metal or metal compound | | Crosslinking modifier | | Oxidant | | Irradiation megareps (type) |
|---|---|---|---|---|---|---|
| Type | Parts | Type | Parts | Type | Parts | |
| B | 50 | Divinyl benzene | 3 | Ammonium perchlorate | 200 | 10 |
| Triethyl B | 30 | ...do... | 10 | Potassium perchlorate | 150 | 5 |
| Tripropyl Al | 50 | 50% Divinyl benzene 50% ethyl styrene | 10 | Potassium nitrate | 250 | 10 |
| Diethyl Be | 40 | Diallyl | 5 | Perchloryl benzene | 100 | [1] 15 |
| Diethyl Mg | 35 | ...do... | 5 | Ammonium nitrate | 100 | 10 |
| Al hydride | 25 | Divinyl diphenyl | 10 | Ammonium perchlorate | 300 | 10 |
| Diethyl AlH | 40 | Divinyl cyclohexene | 10 | ...do... | 200 | 10 |
| Decaborane | 100 | Divinyl benzene | 10 | ...do... | 250 | [2] 15 |
| Al | 60 | ...do... | 5 | ...do... | 200 | 15 |
| Be | 50 | ...do... | 5 | ...do... | 200 | 10 |
| BeH$_2$ | 50 | ...do... | 5 | Perchloryl benzene | 200 | 51 |
| Mg | 40 | Resorcinol diacrylamide | 3 | ...do... | 150 | [3] 15 |
| MgH$_2$ | 50 | Diallyl | 5 | Potassium perchlorate | 200 | 10 |
| Pentaborane | 60 | ...do... | 5 | ...do... | 200 | 15 |
| Triphenyl B | 40 | ...do... | 5 | ...do... | 200 | [4] 15 |

[1] Van de Graaff.
[2] Bombarded beryllium.
[3] Cobalt.
[4] X-ray.

Example VIII

The procedure of Example VII is repeated using 100 parts of polypropylene in place of the polyethylene. Similar excellent results are obtained.

Example IX

The procedure of Example VII is repeated using in each case 100 parts of a copolymer of 25% styrene and 75% butadiene in place of the polyethylene. In each case very good results are obtained upon testing the product.

Example X

The procedure of Example VII is repeated using in each case 100 parts of polymeric vinyl cyclohexane in place of the polyethylene. Upon testing, each product gives similar excellent results.

Example XI

The procedure of Example VII is repeated using 100 parts of polystyrene. Good results are otbained upon testing.

Example XII

One hundred parts of paraffin having a melting point of 60° C. are placed in a glass container under an atmosphere of nitrogen while the various metal compositions (finely divided when solid) indicated in Table V are added under nitrogen atmosphere and the container sealed. The mixture is heated to melt the wax so as to provide intimate contact between the ingredients. Then it is cooled to room temperature and irradiated. After the indicated irradiation dosages have been applied, the product, in each case, shows excellent burning properties upon ignition and the flame has a color characteristic of the metal alkyls.

TABLE V

| Metal or Metal Compound | | Irradiation | |
|---|---|---|---|
| Type | Parts | Megareps | (Type) |
| B | 40 | 50 | |
| Triethyl B | 40 | 60 | Van de Graaff. |
| Tripropyl Al | 35 | 40 | |
| Diethyl Be | 40 | 30 | |
| Diethyl Mg | 35 | 40 | X-ray. |
| Diethyl AlH | 30 | 40 | |
| Decaborane | 100 | 50 | Bombarded beryllinm. |
| Al | 50 | 50 | |
| Be | 40 | 45 | |
| BeH₂ | 50 | 40 | Cobalt 60. |
| Mg₂ | 40 | 50 | |
| MgH₂ | 50 | 40 | |
| Pentaborane | 60 | 45 | |
| Triphenyl B | 40 | 50 | |

Various crosslinking modifiers can be used in accordance with the practice of this invention, including compounds having one or more ethylenic or acetylenic groups therein. These serve to lower the energy level of irradiation required to produce the desired degree of crosslinking. The modifiers comprise organic compounds containing two unsaturated groups of the ethylenic or acetylenic type or derivatives thereof, which are connected through groups or linkages which are relatively stable to irradiation.

One type of crosslinking modifier includes those having the formula:

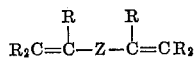

wherein Z is a divalent aromatic or aliphatic (including cycloaliphatic, unsaturated aliphatic, and heterocyclic groups containing in the ring structure carbon, and a minor part of nitrogen and/or oxygen) groups and combinations thereof, in which groups there are at least two carbon atoms between said valencies; R is hydrogen, or an alkyl, aryl, chloro, fluoro, cyano, —COOR″, —CH₂COOR″, two R's can also represent a third bond between the two carbons, and R can also be joined with another R or Z to form a cycloaliphatic or heterocyclic ring containing a minor portion of nitrogen and/or oxygen, and R″ is hydrogen or a hydrocarbon group; preferably R is hydrogen, or two R's represent a third bond between the two carbons, or one R substituted with a lower alkyl group, such as methyl or ethyl. Z, K, and the R groups can have substituted thereon radicals which will not interfere with irradiation, such as hydrocarbon, chloro, fluoro, alkoxy, aryloxy, cycloalkoxy, alkaryloxy, aralkoxy, acyloxy, cyano, —COOR″, —CH₂COOR″, etc.

Typical compounds of the above formula include the following: dialkenyl aryl compounds, dialkenyl alkanes, dialkenyl cycloalkanes, dialkenyl derivatives of pyridine, piperidine, morpholine, furane, pyrimidine, piperazine, etc., alkenyl cycloalkenes, etc.

Another type of modifier includes compounds having the formula A—Z—A′ wherein A and A′ can be identical or dissimilar groups selected from the formulas:

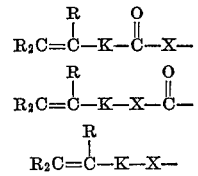

wherein K is any divalent aromatic or aliphatic group (including cycloaliphatic, unsaturated aliphatic, and heterocyclic groups containing in the ring structure, carbon, and a minor part of nitrogen and/or oxygen) and combinations thereof, and can also represent a single bond between the two adjacent atoms; X is oxygen or NR″; R″, Z and R are as defined above. Compounds of this formula include polyunsaturated polyesters, polyethers, ether-esters, polyamides, polyamines, amide-esters, amine-esters, ether-amides, ether-amines. Groups on Z, K, and R are as indicated above.

Other modifiers that can be used include those having the formulas:

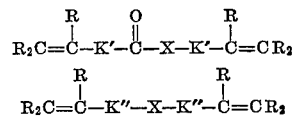

wherein R and X are as defined above, and K′ and K″ are the same as defined above for K, but the sum of carbon atoms between said valencies in the two K's is at least 2, and the sum of carbon atoms between said valencies in the two K's is at least 3. Compounds fitting these formulas are polyunsaturated monoesters, monoethers, monoamides, and monoamines having 3 or more carbon atoms between the unsaturated groups.

Other modifiers can be used which have one of the following formulas:

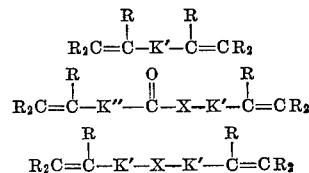

wherein R and X are as defined above; K′ is as defined above, except that when it is a divalent radical; then both valencies are attached to the same carbon atom; and K″ is a single bond, or, when K′ is the same compound is a single bond, then K″ can be a divalent radical having both valencies on the same carbon atom. Such compounds include butadiene-1,3 and its derivatives, pentadiene-1,4 and its derivatives, 1-vinyl-cyclohexene-1 and its derivatives, 1-vinyl-cyclohexane-2 and its derivatives, 4,4-divinyl piperidine, 1,1-divinyl-cyclohexane, furane, 3-allyl-furane, allyl acrylate, vinyl acrylate, isopropenyl methacrylate, isopropenyl chloracrylamide, vinyl methacrylamide, allyl acrylamide, vinyl acrylamide, vinyl crotonate, vinyl buten-3-oate, isopropenyl buten-3-oate, vinyl buten-3- amide, isopropenyl buten-3-amide, divinyl ether, diallyl ether, divinyl amine, diisopropenyl amine, vinyl allyl amine, diallyl amine, etc.

Polyalkenyl aryl compounds which can be used in the practice of this invention include; divinyl benzene, trivinyl benzene, divinyl naphthalene, trivinyl naphthalene, divinyl diphenyl, trivinyl diphenyl, divinyl toluene, trivinyl toluene, divinyl xylene, divinyl anisole, divinyl ethyl benzene, divinyl chlorobenzene, divinyl methylnaphthalene, divinyl ethylnaphthalene, divinyl methyldiphenyl, divinyl ethyldiphenyl, divinyl ethoxy naphthalene, divinyl chloronaphthalene, divinyl chlorodiphenyl, divinyl ethoxy diphenyl, vinyl isopropenyl benzene, vinyl isopropenyl naphthalene, vinyl isopropenyl diphenyl, vinyl isopropenyl toluene, vinyl isopropenyl anisole, vinyl isopropenyl chlorobenzene, vinyl isopropenyl methoxyl naphthalene, vinyl isopropenyl chloronaphthalene, vinyl isopropenyl methyl chloronaphthalene, vinyl isopropenyl chlorodiphenyl, vinyl isopropenyl methoxy diphenyl, vinyl isobutenyl benzene, vinyl isobutenyl naphthalene, vinyl isobutenyl diphenyl, vinyl allyl benezene, vinyl allyl naphthalene, vinyl allyl diphenyl, vinyl allyl toluene, vinyl allyl anisole, vinyl allyl methylnaphthalene, vinyl ally chorodiphenyl, diallyl benzene, triallyl benzene, diallyl naphthalene, triallyl naphthalene, diallyl diphenyl, triallyl diphenyl, diallyl toluene, diallyl xylene, diallyl chorobenzene, diisopropenyl benzene, diisopropenyl naphthalene, diisopropenyl diphenyl, diisopropenyl toluene, diisopropenyl anisole, diisopropenyl methyl naphthalene, diisopropenyl chlorodiphenyl, dimethallyl benzene, dimethallyl naphthalene, dimethallyl diphenyl, bis-(alpha-ethyl-ethenyl)-benzene, bis-(alpha-ethyl-ethenyl)-naphthalene, bis-(alpha-ethyl-ethenyl)-diphenyl, bis-(alpha-vinyl-ethyl)-benezene, bis-(alpha-vinyl-ethyl-naphthalene, bis(alpha-vinyl-ethyl)-diphenyl, vinyl (alpha-vinyl-ethyl)-benzene, vinyl (alpha-vinyl-ethyl)-naphthalene, vinyl (alpha-vinyl-ethyl)-diphenyl, etc.

Other polyalkenyl aryl compounds that can be used include: dicrotyl benzene, dicrotyl naphthalene, dicrotyl diphenyl, dicrotyl anisole, dicrotyl xylene, bis-(4-vinyl-n-butyl)-benzene, bis-(5-isopropenyl-n-hexyl)-benzene, bis-(5-isopropenyl-n-hexyl)-disphenyl, bis-(5-methyl-hepten-5-yl)-benzene, bis-(5-methyl-nonene-6-yl)-diphenyl, bis-(n-decen-5-yl)-toluene, di-cyclopentenyl-naphthalene, divinyl carbazole, di-cyclohexenyl-benzene, etc.

Typical acetylenic hydrocarbons that can be used in the practice of this invention includes: phenylene diacetylene, naphthylene diacetylene, ethylene diacetylene, cyclohexylene diacetylene, n-hexane-5-yl-acetylene, etc.

Typical polyalkenyl aliphatic compounds that can be used in the practice of this invention include: diallyl, 1,6-heptadiene; 1,8-nonadiene; 2,8-decadiene; 2,9-dimethyl-2, 8-decadiene, divinyl cyclohexane, divinyl cyclopentane, divinyl methyl cyclohexane, diallyl cyclohexane, diallyl cyclopentane, dibutenyl cyclohexane, dipentenyl cyclohexane; 1-vinyl-cyclohexene-3; 1-allyl-cyclohexene-2; 1-allyl cyclohexene-3; diallyl cyclohexene, divinyl cyclohexene, divinyl piperidine, diallyl piperidine, diisopropenyl piperidine, divinyl pyridine, diallyl pyridine, diisopropenyl pyridine, dibutenyl pyridine; 3,5-divinyl morpholine; 2,5-divinyl piperazine; 1,4-dixinyl piperazine, (beta-vinylalkyl)-furane, (beta-allyl-ethyl)-furane, 1,7-diphenyl-heptadiene-1,6, 2,7-diphenyloctadiene-1,7, etc.

Various polyunsaturated polyesters suitable for the practice of this invention can be derived by forming the esters of acrylic acid and its various derivatives as indicated above with various polyhydroxy compounds of the formula:

HO—Z—OH with Z as defined above. The various acrylic derivatives are the alpha-methyl (methacrylic), alpha-chloro (chloracrylic), beta-methyl (crotonic), alpha-chloro-beta-methyl and alpha,beta-dimethyl derivatives. Examples of various polyhydroxy compounds from which the polyesters can be prepared are: ethylene glycol, trimethylene glycol, tetramethylene glycol, 2,3-dihydroxybutane, 1,4- dihydroxybutane, 1,4-dihydroxy-2-phenylbutane, 1,6-dihydroxy-hexane, 1,8-dihydroxy-octane, 2,11-dihydroxy-dodecane, 2,11-dimethyl-2,11-dihydroxyl-dodecane, resorcinol, hydroquinone, cathechol, dihydroxynaphthalene, trihydroxy benzene, trihydroxy naphthalene, dihydroxymethylnaphthalene, dihydroxy toluene, dimethylol benzene, di-(beta - ethylol) - benzene, di-(alpha-ethylol-benzene, di-(beta-ethylol)-naphthalene, bisphenol or 2,2-di-(p-phenylol)-propane, beta-ethylol-phenol, beta-ethylol-naphthol, omega-hydroxy-n-octyl-phenyl, n-octyl-resorcinol, alpha-methyl-heptyl-resorcinol, sec-butyl-resorcinol, ethoxy-resorcinol, 1,8-dihydroxy-4-acetoxy-octane, phenoxy resorcinol, beta-phenylethoxy-hydroquinone, (ethylphenoxy)-catechol, acetoxy-dihydroxy naphthalene, 1,4-dihydroxy-cyclohexane, 1,4-dimethylol-cyclohexane, benzoxy-resorcinol, octoxy-bisphenol, 2,2-dimethyl-propanediol-1,3, 3-methyl-pentanediol-1,4, 2,2-diethylbutanediol-1,3, 4,5-dihydroxy-nonane, pentamethylene glycol, heptamethylene glycol, nonamethylene glycol, decamethylene glycol, glyceryl monoacetate, glyceryl monobenzoate, dihydroxyl-vinyl-naphthalene, 2,11-dihydroxy-dodecene-5, 2,11-dihydroxy-6-vinyl-dodecane, 2,34-dihydroxy lycopene, dihydroxy-ethyl naphthalene, dihydroxy-ethoxy-naphthalene, dihydroxy-diphenyl, dihydroxy-phenethoxy-diphenyl, (ethylphenyl)-hydroquinone, (ethyl-phenoxy)-resorcinol, 2-phenoxy-propane-1,3-diol, beta-ethylol-hydroxy-diphenyl, gamma-hydroxy-propylphenol, 2-hydroxy-8-phenylol-nonane, 2,8-dihydroxy-4-phenyl-nonane, etc. Except for practical limitations of availability there would be no upper limit to the number of carbon atoms between the hydroxy groups, particularly when Z is aliphatic since irradiation can also cause cross-linking through that part of the molecule, especially when Z includes alphatic unsaturation such as in derivatives formed from 2,11-dihydroxy-dodecene-6; 2,11-dihydroxy-6-vinyl-dodecane, 2,3,4-dihydroxy-lycopene, vinyl-dihydroxy-naphthalene, etc.

Such polyunsaturated polyesters which can be used in the practice of this invention include the following as examples: ethylene glycol diacrylate and dimethacrylate, trimethylene glycol diacrylate, tetramethylene glycol dimethacrylate, pentamethylene glycol dicrotonate, hexamethylene glycol-di-(cloroacrylate), diacrylate of 2,3-dihydroxybutane, dimethacrylate of 1,3-dihydroxy-butane, diacrylate of 1,6-dihydroxy-hexane (hexamethylene glycol), dimethacrylate of 1,8-dihydroxyoctane, di-chloracrylate of 2,11-dihydroxy-dodecane, dicrotonate of 2,11-dimethyl-2,11-dihydroxy-dodecane, diacrylate of decamethylene glycol, diacrylate of glyceryl monoacetate, dimethacrylate of glyceryl monostearate, diacrylate of glycerine. diacrylate of dihydroxy-ethoxyl naphthalene, diacrylate of (ethylphenyl)-hydroquinone, dimethacrylate of (ethyl-phenoxy)-resorcinol, diacrylate of di-(beta-ethylol)-benzene, diacrylate of omega-hydroxy-n-octyl-phenol, dicrotonate of dihydroxy-methylnaphthalene, di(chloroacrylate) of dihydroxy-diphenyl, the acrylate-methacrylate mixed ester of dihydroxy-diphenyl, the crotonate-chloroacrylate mixed ester of resorcinol, etc.

Polyunsaturated polyesters suitable for the practice of this invention can also be derived by forming the esters of unsaturated alcohols such as vinyl, isopropenyl, alpha-chloro-vinyl, allyl, methallyl, alpha-phenethyl-allyl, beta-chlorallyl, alpha-phenyl-allyl acohols, 2-methylol-1,4-buta-diene, 7-hydroxy-octene-1, 7 -hydroxy-2-methyl-octene-1, 2-hydroxy-2-methyl - octadiene-4,7,3-hydroxy-3-methyl-butene - 1, penten-1-ol-5,2,5-dimethyl-5-hydroxy-hexene-1, 17-hydroxy-octadecene-1; 5-acetoxy-7-hydroxy-octene-1; 5-phenoxy-7-hydroxy-octene-1, etc. with polycarboxylic acids of the formula HOOC—Z—COOH, with Z defined as above.

Various polycarboxylic acids from which the polyunsaturated polyesters can be prepared include: phthalic, isophthalic, trimellitic, terephthalic, acetoxy-phthalic, phenoxy-phthalic, 3-vinyl-phthalic, 3-allyl-phthalic, phenethoxy terephthalic, naphthalene dicarboxylic, diphenyl dicarboxylic, butyroxy-naphthalene dicarboxylic, octyl-naphthalene dicarboxylic, nonyl-diphenyl dicarboxylic, sebacic, acetoxy-sebacic, azelaic, butoxy-azelaic, adipic, itaconic, glutaconic, decapentaene-10-dicarboxylic, pimelic, ethyl-phenyl-glutaric, benzoxy-glutaric, glutaric, octyl-succinic, phenyladipic, japanic (nonadecene-1,19-dicarboxylic acid), thapsic, malonic, methyl-succinic, hydroxy-succinic, brassilic, suberic acids, etc., and also including the condensation products of maleic anhydride with $C_{22}$ and similar olefins, and their hydrogenation products.

Typical polyunsaturated polyesters which can be used in the practice of this invention include the following: divinyl phthalate, diallyl phthalate, diallyl-acetoxy-phthalate, diisopropenyl phthalate, dimethylallyl phthalate, diallyl butoxy phthalate, di-(alpha-chloro-vinyl) phthalate, di-(1-methyl-5-vinyl-pentyl)phthalate, diallyl terephthalate, divinyl terephthalate, triallyl-trimellitate, diisopropenyl naphthalene dicarboxylate, dimethallyl-diphenyl dicarboxylate, di-(alpha-chloro-vinyl) octyl-naphthalene dicarboxylate, diallyl succinate, divinyl succinate, diisopropenyl succinate, divinyl adipate, diallyl phenyl adipate, diisopropenyl butoxy-azelate, di-(beta-chlorallyl)-acetoxyphthalate, dimethallyl phenoxy-naphthalene dicarboxylate, etc.

Polyunsaturated polyesters suitable for the practice of this invention can be derived by forming the ethers of unsaturated alcohols such as vinyl, isopropenyl, alpha-chloro-vinyl, allyl, methallyl, alpha-phenethyl-allyl, beta-chlorallyl, alpha-phenyl-allyl alcohols, 7-hydroxy-octene-1, 7-hydroxy-2-methyl-octene-1, 3-hydroxy-3-methyl-butene-1, penten-1-ol-5, 2,5-dimethyl-5-hydroxy-hexene-1, 17 - hydroxy-octadecene-1,5-acetoxy-7-hydroxy-octene-1, 5-phenoxy-7-hydroxy-octene-1, etc., with polyhydric compounds of the formula HO—Z—OH, with Z defined as above.

Examples of various polyhydric compounds from which the polyethers can be prepared are ethylene glycol, trimethylene glycol, 2,3-dihydroxybutane, 1,4-dihydroxybutane, 1,3-dihydroxy-2-phenyl-butene, 1,6-dihydroxyhexane, 1,8-dihydroxy-octane, 2,11-dihydroxy-dodecane, 2,11-dimethyl-2,11-dihydroxy-dodecane, 2,2-dimethyl-propanediol - 1,3, 3-methylpentanediol-1,4,2,2-diethylbutanediol-1,4, 4,5-dihydroxy-nonane, pentamethylene glycol, heptamethylene glycol, nonamethylene glycol, decamethylene glycol, glyceryl nonoacetate, glyceryl monobenzoate, resorcinol, hydroquinone, catechol, dihydroxymethylnaphthalene, dihydroxy-vinyl-naphthalene, 2,11-dihydroxy-dodecane - 6, 2,11 - dihydroxy-6-vinyl-dodecane, 2,34-dihydroxy lycopene, dihydroxy-ethyl naphthalene, dihydroxy-ethoxy-naphthalene, dihydroxy-diphenyl, dihydroxy-phenethoxy - diphenyl, (ethylphenyl) - hydroquinone, (ethylphenoxy) - resorcinol, 2-phenoxy-propane-1,3-diol, beta-ethylol-hydroxy-diphenyl, gamma-hydroxy-propyl-phenol, 2 - hdyroxy-8-phenylol-nonane, 2,8-dihydroxy-4-phenyl-nonane, dihydroxy-toluene, dimethylol benzene, di-(beta-ethylol) - benzene, di-(alpha-ethylol)-benzene, di-(beta-ethylol)-naphthalene, bisphenol or 2,2-di-(p-phenylol)-propane, beta - ethylol - phenol, beta - ethylol - naphthol, omega-hydroxy-n-octyl-phenol, n-octyl-resorcinol, alpha-methyl-heptyl-resorcinol, sec-butyl resorcinol, ethoxy-resorcinol, 1,8 - dihydroxy - 4-acetoxy-octane, phenoxy resorcinol, beta - phenylethoxy-hydroquinone, (ethylphenoxy)-catechol, acetoxy-dihydroxy naphthalene, benzoxy resorcinol, octoxy-bisphenol, etc. Except for practical imitations of availability, there is no upper limit to the number of carbon atoms between the hydroxy groups, particularly when Z is aliphatic since irradiation can cause crosslinking through that part of the molecule.

Polyunsaturated polyethers which can be used in the practice of this invention include the following as examples: the divinyl diethers of ethylene glycol, trimethylene glycol, pentamethylene glycol, hexamethylene glycol, 2,3-dihydroxybutane, 1,4-hydroxybutane, 1,4-dihydroxyphenyl-butane, resorcinol, di-(beta-ethylol)-benzene, etc., various diallyl diethers, such as the diallyl diether of ethylene glycol, trimethylene glycol, tetramethylene glycol, 2,3-dihydroxy-butane, resorcinol, beta-ethylol phenol, bisphenol, etc.; the diisopropenyl diethers of the aforementioned polyhydric compounds, such as the diisopropenyl diether of ethylene glycol, trimethylene glycol, tetramethylene glycol, 1,6-dihydroxy hexane, trihydroxy benzene, trimethylol benzene, etc.; dimethallyl diethers of ethylene glycol, trimethylene glycol, pentamethylene glycol, resorcinol, etc.; diethers of 2-methylol-butadiene-1,4, and of 2-hydroxy-2-methyl-octadiene-4,7 with dihydroxy naphthalene, dihydroxy toluene, beta-ethylol-phenol, ethoxy resorcinol, etc.; the di-(alpha-chloro-vinyl) diether of 1,8-dihydroxy-octane, the ethylene glycol diether of 7-hydroxy-2-methyl-octene-1, the diether of beta-ethylol-phenol and 3-hydroxy-3-methyl-butene-1, the ethylene glycol diether of 17-hydroxy-octadecene-1, the decamethylene glycol diether of pentene-1-ol-5, the diether of gamma-hydroxy-propyl-phenol and 5-phenoxy-7-hydroxy-octene-1, the diether of alpha-phenethyl-allyl-alcohol and beta-ethylol-hydroxy-diphenyl, the diether of dihydroxy-phenoxy, naphthalene and 5-phenoxy-7-hydroxy-octene-1, etc., as well as corresponding triethers such as trivinyl, triisopropenyl, triallyl triethers of 2,5,7-trihydroxy-n-octane, trihydroxy - benzene, trimethylol benzene, trihydroxy naphthalene, etc., divinyl diethers of benzoxy-resorcinol, phenethyl-resorcinol, acetoxy-resorcinol, propyl-resorcinol, propoxy-resorcinol, etc., diallyl diethers of 1,3-dihydroxy - 3-phenylbutane, 5-ethoxy-2,7-dihydroxy-n-octane, (beta-hydroxy-ethyl)-phenyl, phenol, etc.

Examples of other polyunsaturated polyesters that can be used include: tetramethylene bis-hexen-5-oate, trimethylene bis-octen-4-oate, hexamethylene bis-hepten-4-oate, tetramethylene glycol diester of the monomethyl ester of maleic acid, the ethylene glycol diester of the monoethyl ester of itaconic acid, the tetramethylene glycol diester of beta-cyano-acrylic acid, the hexamethylene glycol diester of cyclohexene-3-formic acid, the tetramethylene glycol diester of cyclopentene-3-formic acid, octen-4-yl 5 - crotonoxy - caproate, decen-6-yl 11-(beta-cyano-acryloxy)-octadecanoate, hexen-3-yl 8-(p-butenyl-benzoxy)-octanoate, diallyl cyclohexylene diacetate, dibutenyl cyclohexylene-diformate, etc.

Examples of other polyunsaturated polyethers that can be used include: the ethylene glycol diether of 17-hydroxy-octadecene-8, the hexamethylene glycol diether of penten-3-ol-1, the hexamethylene glycol diether of 7-hydroxy-octene-4, the tetramethylene glycol diether of cyclohexen-3-ol, the ethylene glycol diether of cyclohexene-3-ethylol, the cyclohexene glycol diether of hexene-3-ol-1, bis (beta-n-octyloxy-ethyl)-cyclohexane, etc.

Various polyunsaturated polyamides suitable for the practice of this invention can be derived by forming the amides of acrylic acid and its various derivatives with various polyamino compounds of the formula:

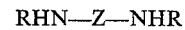

RHN—Z—NHR with Z and R as defined above.

Typical polyunsaturated polyamides that can be used in the practice of this invention include the following as examples: ethylene diacrylamide and dimethacrylamide, trimethylene diacrylamide, tetramethylene dimethacrylamide, pentamethylene dicrotonamide, hexamethylene di-(chloracrylamide), diacrylamide of 2,3-diaminobutane, dimethacrylamide of 1,3-diaminobutane, diacrylamide of 1,6-diaminohexane, dimethacrylamide of 1,8-diamino octane, di-chloroacrylamide of 2,11-diamino dodecane, dicrotonamide of 2,11-dimethyl-2,11-diamino dodecane, diacrylamide of decamethylene diamine, dimethacrylamide of (phenyl diamine), diacrylamide of di-(beta-amino-ethyl)-benzene, dicrotonamide of diamino methyl naphthalene, di(chloracrylamide) of diaminodiphenyl, the acrylamide-methacrylamide mixed amide of diamino diphenyl, the crotonamide-acrylamide mixed amide of phenylene diamine, the ethylene diamide of hexen-3-oic acid, the tetraethylene diamide of octen-5-oic acid, the trimethylene diamide of the monomethyl amide maleic acid, the hexamethylene diamide of the monoethyl ester of itaconic acid, the hexamethylene diamide of beta-cyano-acrylic acid, etc.

Polyunsaturated polyamides suitable for the practice of this invention can also be derived by forming the amides of unsaturated amines with polycarboxylic acid of the formula HOOC—Z—COOH with Z defined as above. Typical suitable carboxylic acids of this formula are listed above for use in the preparation of polyesters.

Typical polyunsaturated polyamides of this type include the following:

N,N'-divinyl phthalic diamide,
N,N'-diallyl phthalic diamide,
N,N'-diisopropenyl phthalic diamide,
N,N'-dimethallyl phthalic diamide,
N,N'-diallyl acetoxy-phthalic diamide,
N,N'-di-(1-methyl-5-vinyl-pentyl)-phthalic diamide,
N,N'-diallyl terephthalic diamide,
N,N'-divinyl terephthalic diamide,
N,N',N''-triallylmellitic triamide,
N,N'-diisopropenyl naphthalene dicarboxylamide,
N,N'-methallyl-diphenyl-dicarboxylamide,
N,N'-diallylsuccinic diamide,
N,N'-divinyl succinic diamide,
N,N'-diisopropenyl succinic diamide,
N,N'-divinyl adipic diamide,
N,N'-diallyl phenyl adipic diamide,
N,N'-diisopropenyl butoxy-azelaic diamide,
N,N'-di-(beta-chlorallyl)-phthalic diamide,
N,N'-di-hexen-3-yl itaconic diamide,
N,N'-di-octen-5-maleic diamide,
N,N'-dicrotyl azelaic diamide,
N,N'-dicrotyl naphthalene dicarboxylamide,
N,N'-dioctenyl adipic diamide,
N,N'-dipropargyl azelaic diamide,
N,N'-dipropargyl phthalic diamide,
N-allyl 5-acrylamido-caproamide,
N-butenyl 11-methacrylamido-undecanamide,
N-hexen-3-yl-9-hexenoxy-nonamide, etc.

Typical polyunsaturated polyamines that can be used in the practice of this invention include the following as examples:

1,4-bis(vinylamino)-butane,
hexamethylene bis(vinylamine),
1,8-bis-(allylamine)-octane,
1,9-di-(isopropenylamino)-decane,
bis(vinylamino)-benzene,
bis(allylamino)-diphenyl,
bis(isopropenylamino)-naphthalene,
bis-(N-methyl-isopropenylamino)-benzene,
1,4-bis-(beta-cyclohexene-3-ethyl-amino)butane,
1,6-bis-(n-hexen-3-yl-amino)-hexene, etc.

Typical polyunsaturated ester-amides, ether-amides, ester-amines, amino-amides, and ether-amines that can be used in the practice of this invention include as typical examples: pentamethylene monoacrylate monoacrylamide, hexamethylene monomethacrylate monomethacrylamide, trimethylene monoacrylate monomethacrylamide, (para-acryloxy-phenyl)acrylamide, the dimethylamide of the mono-hexan-4-yl ester of itaconic acid, etc., the N-vinyl amide of the monovinyl ester of phthalic acid, the monoallyl amide-monoallyl ester of succinic acid, the hexen-4-yl monoester allyl monamide of azelaic acid, the allyl ester of 5-acrylamido caproic acid, the isopropenyl ester of 14-methacrylamido undecanoic acid, cyclohexen-3-yl ester of 5-betacyano acrylamido-caproic acid, the vinyl ether of ethylene monoacrylamide, the allyl ether of trimethylene monomethacrylamide, the allyl ether of trimethylene monomethacrylamide, the methallyl ether of tetramethylene monochloracrylamide, the chlorallyl ether of pentamethylene monocrotonamide, the alpha-phenyl-allyl ether of monoacrylamide of 2,11-dimethyl-2-hydroxy-11-amino-dodecane,
N-allyl 5-allyloxy caproamide,
N-isopropenyl 11-(hexen-4-oxy)-octadecanamide,
N-vinyl(p-vinylphenoxy)-benzamide,
4-vinyl(4-allyloxy-cyclohexyl)-formamide,
1-acryloxy-9-allylamino-nonane,
p-(hexen-3-yl-amine)-phenyl methacrylate,
(4-allylamino-cyclohexyl)crotonate,
methallyl 11-methallylamino-undecanoate,
isopropenyl 5-isopropenylamino-caproate,
vinyl 9-(hexen-3yl-amino)-nonate,
N-(4-allylamino-butyl)acrylamide,
N-(6-isopropenylamino-hexyl)methacrylamide,
N-(p-butenylamino-phenyl) crotonamide,
N-(4-vinylamino-cyclohexyl)hexen-4-amide,
N-allyl 5-allylamino-caproamide,
N-cyclohexeneyl 11-cyclohexenylamino-undecanamide,
1-vinyloxy-9-vinylamino-nonane,
2-allyloxy-10-allylamino-undecane,
1-hexenyloxy-4-hexenylamino-cyclohexane, etc.

Typical polyunsaturated monoamides and monoamines of the above formulas, suitable for the practice of this invention, include N-(p-vinyl-phenyl)acrylamide,
N-(o-vinyl-phenyl) methacrylamide,
N-(m-vinyl-phenyl) chloracrylamide,
N-(p-vinyl-phenyl) crotonate,
N-(p-isopropenyl-phenyl)acrylamide,
N-(o-isopropenyl-phenyl)-methacrylamide,
N-(m-isopropenyl-phenyl) chloracrylamide,
N-(p-isopropenyl-phenyl) crotonamide,
N-(p-allyl-phenyl) acrylamide,
N-(p-allyl-phenyl) crotonamide,
N-allyl para-(4-vinyl-1-methyl-n-butyl)-phenyl acrylamide,
N-allyl para-(4-vinyl-1-methyl-n-butyl)-benzamide,
N-(n-hexene-3-yl)hexene-3-amide,
para-isopropenyl-para'-(isopropenyl-amino)-diphenyl,
the allyl amine of para-(6-isopropenyl-1-methyl-n-hexyl)-diphenyl,
1-(allyl-amino)-7-isopropenyl-heptane,
1-(isopropenyl-amino)-6-isopropenyl-hexane,
1-(vinyl-amino)-8-vinyl octane,
bis-(4-vinyl-cyclohexyl)-amine,
bis-(4-isopropenyl-cyclohexyl)-amine,
N-(n-hexene-3-yl) 4-allyl-cyclohexyl-formamide,
4-allyl-cyclohexyl crotonamide,
diallyl-amine,
dimethallyl-amine,
di-hexane-3-yl-amine, etc.

Other examples of polyunsaturated modifiers of the above formula that can be used in the practice of this invention include: the vinyl ether of ethylene glycol monoacrylate; the allyl ether of trimethylene glycol monomethacrylate; the methallyl ether of tretamethylene glycol monochloracrylate; the chlorallyl ether of pentamethylene glycol monocrotonate; the mono-(beta-methyl-chloracrylate) of the isopropenyl ether of 1,4-dihydroxy-2-phenyl-butane; the alpha-phenyl-allyl ether of the monoacrylate of 2,11-dimethyl-2,11-dihydroxy-dodecane; the monoacrylate monocrotonate of the glyceryl monoether of 7-hydroxy-octene-1; the isopropenyl-ether of the monoacrylate of 2,11-dihydroxy-dodecene-6; the monoether of 2-methylol-1,4-butadiene and the monomethacrylate of 2,11-dihydroxy-6-vinyl-dodecane; the monoether of 2-hydroxy-2-methyl-octadiene-4,7 and the monoacrylate of 2,34-dihydroxy-2,3,34,35-tetrahydrolycopene; the isopropenyl ether of the monochloracrylate of hexamethylene glycol; the mono-(alpha, beta-dimethylacrylate) of the 7-hydroxy-octene-1 ether of 1,8-dihydroxy-octane; the monoacrylate of the 3-hydroxy-3-methyl-butene-1 ether of resorcinol; the monomethacrylate of the ether of pentene-1-ol-5 and dihydroxynaphthalene; the monomethacrylate of the ether of 2,5-dimethyl-5-hydroxy-hexene-1 and dihydroxy-methyl-diphenyl; the monoacrylate of the ether of 17-hydroxy-octadecene-1 and dihydroxy-acetoxy-naphthalene; the monocrotonate of the ether of 5-acetoxy-7-hydroxy-octene-1 and di-(beta-ethylol)-benzene; the monoacrylate of the ether of 5-phenoxy-7-hydroxy-octene-1 and benzoxy resorcinol; the monoacrylate of the vinyl ether of beta-ethylol phenol; the monomethacrylate of the allyl ether of ethoxy resorcinol; the monoacrylate of the isopropenyl ether of phenoxy-hydroquinone; the monoacrylate of the isopropenyl ether of beta - phenylethoxy - hydroquinone; the monomethacrylate of the isopropenyl ether of 1,8-dihydroxy-4-acetoxy-dodecane; the monoacrylate of the vinyl ether of (ethylphenoxy) - dihydroxy - naphthalene; the monoacrylate of the diisopropenyl ether of trihydroxy-naphthalene; the monoacrylate, monochloracrylate of the allylether of 2,5,7-trihydroxy-octane, etc.

Such modifiers also include;

vinyl beta-acryloxy-butyrate;
methallyl epsilon-methacryloxy-caproate;
isopropenylomega-chloracryloxy-dodecanoate;
vinyl beta-acryloxy propionate;
allyl 11-crotonoxy-hexadecanoate;
a-phenyl-allyl omega-acryloxy decanoate;
(1-methyl-5-vinyl-n-pentyl) p-acryloxy-benzoate;
(alpha, alpha-dimethyl-allyl)(beta-methyl-chloracryloxy)-ethoxy-benzoate;
(3-vinyl-n-propyl) p-acryloxyphenyl-acetate;
(1,1-dimethyl-3-isopropenyl-propyl-acryloxy-methoxybenzoate;
(1-methyl-15-vinyl-n-pentadecyl) 2-acryloxy-2-phenylpropionate;
(1-methyl-3-acetoxy-5-vinyl-n-pentyl) (alpha, beta-dimethyl-acryloxy)-naphthoates;
(1-methyl-3-phenoxy-5-vinyl-n-pentyl) (acryloxy-methoxy)-naphthoate;
isopropenyl 12-acryloxy-octaden-9-oate;
allyl-16-methacryloxy-hexadecen-7-oate;
2-methyl-octadiene-4,7-yl-2-chloracryloxy-(acetoxynaphthoate);
methallyl-5-methacryloxy-8-benzoxy-nonoate;
chlorallyl crotonoxy-ethyl-naphthoate;
allyl methacryloxy-octoxy-benzoate;
a-phenyl-allyl-5-crotonoxy-nonoate;
vinyl-bis-(acryloxy-phenyl)-benzoate;
chlorallyl (acryloxy-phenoxy-ethyl)-benzoate;
vinyl-3-acryloxy-5-chloracryloxy-palmitate;
vinyl beta-vinyloxy propionate;
vinyl beta-allyloxy propionate;
vinyl beta-methallyloxy-butyroate;
allyl epsilon-allyloxy-caproate;
chlorallyl omega-isopropenyloxy-n-hexadecanoate;
alpha-phenyl-allyl 11-(1-methyl-5-vinyl-n-pentyloxy)n-hexadecanoate;
1-methyl-5-vinyl-pentyl omega-(1-methyl-5-vinyl-n-pentyloxy)n-decanoate;
alpha,alpha-dimethyl allyl (alpha-phenyl-allyloxy)-benzoate;
3-vinyl-n-propyl (3-vinyl-n-propyloxy-beta-ethoxy)-benzoate;
vinyl (1,3-dimethyl-3-isopropenyl-n-propoxy-phenyl)-acetate;
1-methyl-15-vinyl-n-pentadecyl alpha-phenyl-beta-(1-methyl-3-acetoxy-5-vinyl-pentyloxy)-propionate;
isopropenyl (1-methyl-3-phenoxy-5-vinyl-pentyloxy)-naphthoate;
(1-methyl-n-heptadecyl) (vinyloxy-methyl)-naphthoate;
isopropenyl acetoxy-(1-methyl-5-vinyl-pentyloxy)-naphthoate;
(3-vinyl-n-propyl)ethyl-(1,2-dimethyl-allyloxy)-naphthoate, methallyl octoxy-(allyloxy)-benzoate;
alpha-phenyl-allyl-5-vinyloxy-8-benzoxy-n-nonoate;
methallyl bis(vinyloxyphenyl)-benzoate;
vinyl ethyl-(vinyloxyphenyl)-benzoate;
vinyl 3,5-diallyloxy-palmitate;
vinyl beta, beta-bis-acryloxy-propionate;
divinyl acryloxy-succinate;
1-methyl-4,6-diallyloxy-heptyl acrylate;
vinyl bis-(isopropenyl-oxy-phenyl)benzoate;
diallyl (beta-allyloxy-ethyl)-terephthalate, etc.

Other suitable polyunsaturated modifiers include:

vinyl-phenyl acrylate,
vinyl-phenyl methacrylate,
vinyl-phenyl chloracrylate,
vinyl-phenyl crotonate,
isopropenyl-phenyl acrylate,
isopropenyl-phenyl methacrylate,
isopropenyl-phenyl chloracrylate,
isopropenyl-phenyl crotonate,
allyl-phenyl acrylate,
allyl-phenyl methacrylate,
allyl-phenyl-chloroacrylate,
allyl-phenyl crotonate,
allyl para-(4-vinyl-1-methyl-n-butyl)-phenyl acrylate,
allyl para-(4-vinyl-1-methyl-n-butyl)-benzoate,
the allyl ether of para-(6-isopropenyl-1-methyl-n-hexyl)-phenol 2-vinyl-5-acryloxy-naphthalene,
2-isopropenyl-5-acryloxy-naphthalene,
1 vinyl-5-methacryloxy-naphthalene,
2-isopropenyl-5-chloracryloxy-naphthalene,
2-allyl-5-methacryloxy-naphthalene,
1-acryloxy-6-(4-vinyl-1-methyl-n-butyl)-naphthalene,
para-vinyl-para'-acryloxy-diphenyl,
para-isopropenyl-para'-methacryloxy-diphenyl,
para-allyl-para'-chloracryloxy-diphenyl,
the allyl ester of 5-(4-vinyl-1-methyl-n-butyl)-naphthoic acid,
the allyl ether of para-(6-isopropenyl-1-methyl-n-hexyl)-diphenyl-carboxylic acid,
6-isopropenyl-1-methyl-hexacrylate,
8-vinyl-1-methyl-n-octylmethacrylate,
the isopropenyl ester of 6-vinyl-heptanoic acid,
the methallyl ester of 6-vinyl-octanoic acid,
the vinyl ester of 7-vinyl nonanoic acid,
the allyl ether of 7-isopropenyl-heptanol-1,
the isopropenyl ether of 6-isopropenyl-hexanol-1,
the vinyl ether of 8-vinyl-octanol-1,
1,8-diisopropenyl-n-octane,
1,6-diisopropenyl-n-hexane, etc.

The amount of polyunsaturated modifier to be added will vary depending on the properties of the base material to which it is added. For example, high molecular weight base materials would require less modifier to bring them to an infusible state, whereas a base material of lower molecular weight would require larger amounts of polyunsaturated modifier. Although even as little as 0.1 percent of polyunsaturated compounds often effects notable changes in the properties of the base material, it is generally advantageous to have at least 1 percent or more of such modifier present. The upper limit in the amount of such modifiers is determined by various factors, such as the effect on the B.t.u. value of the resultant product, etc. While even higher percentages of modifier, based on weight of the base material, might be desired in some cases where a softening effect is desired and where the effect on the B.t.u. value is not adverse or is permissible, as much as 50 percent, based on weight of base material, can be present. However, for practical and economical reasons, it is generally advantageous to add only sufficient modifier to effect infusibility in the base material or to effect such softening as may be desired.

While the desired amount of irradiation is not much more than the amount required to produce crosslinking or infusibility in the material being exposed, it is obviously desirable to avoid exposures of such great amount as to cause degradation or decomposition to such a degree that the product cannot be used for the purposes of this invention. While the upper limit will vary according to the material being treated, many of the base materials can safely be exposed to 100 megareps or more, while exposure of more sensitive materials should be below 80 megareps.

Other shapes and other uses of the fuel than those indicated above are contemplated. For example, solid rods or solid cylinders can be used with combustion being conducted on the outer surfaces. Particularly with the amount of oxidizing agent permitting more easily controlled combustion, the fuel can be used in jet planes and for many other purposes.

While certain features of this invention have been described in detail with respect to various embodiments thereof, it will, of course, be apparent that other modifications can be made within the spirit and scope of this invention and it is not intended to limit the invention to the exact details shown above, except insofar as they are defined in the following claims.

The invention claimed is:

1. A process for producing propellant fuel compositions comprising the step of irradiating a mixture consisting essentially of at least one high molecular weight hydrocarbon material having a molecular weight of at least 300, containing at least 15% aliphatic portion therein and having a plurality of repeating units therein having a formula selected from the class consisting of

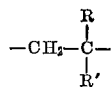

and

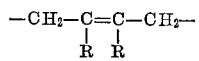

where R is selected from the class consisting of hydrogen and the methyl radical and R' is selected from the class consisting of hydrogen and aliphatic, cycloaliphatic and aromatic hydrocarbon radicals having no more than about 12 carbon atoms therein, in intimate mixture with a metal substance selected from the class consisting of boron, aluminum, beryllium, and magnesium metals, their hydrides and the derivatives of said hydrides in which each of the substituent groups of said derivatives is selected from the class consisting of aliphatic, aromatic and cycloaliphatic hydrocarbon groups, and with a polyunsaturated modifier having a plurality of unsaturated groups therein selected from the class consisting of ethylenic and acetylenic groups and having no elements therein other than selected from the class consisting of carbon, hydrogen, oxygen, nitrogen, chlorine and fluorine, said oxygen being present only in the form of a group selected from the class consisting of ether, acetal, carboxylic ester, carboxylic acid, hydroxyl and amide groups, and said nitrogen being present only in the form of a group selected from the class consisting of amide, amine and cyano groups, the metal content of said mixture being about 1% to about 70% by weight based on the combined weight of said high molecular weight material, said polyunsaturated modifier and said metal substance, the irradiation dosage being at least one megarep and not more than 100 megareps of ionizing irradiation equivalent to at least about 100,000 electron volts.

2. An irradiated, metal-containing composition comprising a product prepared by the irradiation of a mixture consisting essentially of at least one high molecular weight hydrocarbon material having a molecular weight of at least 300, containing at least 15% aliphatic portion therein and having a plurality of repeating units therein having a formula selected from the class consisting of

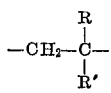

and

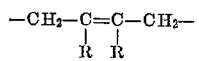

where R is selected from the class consisting of hydrogen and the methyl radical and R' is selected from the class consisting of hydrogen and aliphatic, cycloaliphatic and aromatic hydrocarbon radicals having no more than about 12 carbon atoms therein, in intimate mixture with a metal substance selected from the class consisting of boron, aluminum, beryllium, and magnesium metals, their hydrides and the derivatives of said hydrides in which each of the substituent groups of said derivatives is selected from the class consisting of aliphatic, aromatic and cycloaliphatic hydrocarbon groups, and with a polyunsaturated modifier having a plurality of unsaturated groups therein selected from the class consisting of ethylenic and acetylenic groups and having no elements therein other than selected from the class consisting of carbon, hydrogen, oxygen, nitrogen, chlorine and fluorine, said oxygen being present only in the form of a group selected from the class consisting of ether, acetal, carboxylic ester, carboxylic acid, hydroxyl and amide groups, and said nitrogen being present only in the form of a group selected from the class consisting of amide, amine and cyano groups, the metal content of said mixture being about 1% to about 70% by weight based on the combined weight of said high molecular weight material, said polyunsaturated modifier and said metal substance, the irradiation dosage being at least one megarep and not more than 100 megareps of ionizing irradiation equivalent to at least about 100,000 electron volts.

3. A process of claim 1, in which said metal substance is boron.

4. A process of claim 1, in which said metal substance is aluminum.

5. A process of claim 1, in which said metal substance is magnesium.

6. A process of claim 1, in which said metal substance is beryllium.

7. A process of claim 1, in which said hydrocarbon material is a hydrocarbon polymer having a molecular weight of at least about 3,000.

8. A process of claim 1, in which said hydrocarbon material is a polymeric olefin having a molecular weight of at least about 3,000.

9. A process of claim 1, in which said hydrocarbon material is a polymeric olefin which is essentially aliphatic and has a molecular weight of at least about 3,000.

10. A process of claim 1, in which said hydrocarbon material is polyethylene of a molecular weight of at least about 3,000.

11. A process of claim 1, in which said modifier is a polyalkenyl aromatic hydrocarbon.

12. A process of claim 1, in which said modifier is a dialkenyl benzene.

13. A process of claim 1, in which said modifier is divinyl benzene.

14. A process of claim 1, in which said modifier is a polyunsaturated aliphatic hydrocarbon.

15. A process of claim 1, in which said modifier is diallyl.

16. A process of claim 1 in which said hydrocarbon material is a polymeric olefin which is essentially aliphatic and has a molecular weight of at least about 3,000.

17. A process of claim 1, in which said modifier is a polyunsaturated hydrocarbon.

18. A process of claim 1, in which said mixture also contains about 1% to about 80% by weight of an oxidizing agent selected from the class consisting of solid and liquid oxidizing agents.

19. A process of claim 18, in which said oxidizing agent is finely divided potassium perchlorate.

20. A process of claim 18, in which said oxidizing agent is finely divided ammonium perchlorate.

21. A process of claim 1, in which said mixture contains at least about 1% of a polyunsaturated hydrocarbon modifier, based on the combined weight of said modifier and said hydrocarbon material, and also contains about 1% to about 80% by weight of an oxidizing agent selected from the class consisting of solid and liquid oxidizing agents.

22. A process of claim 21, in which said hydrocarbon material is a polymeric olefin which is essentially aliphatic and has a molecular weight of at least about 3,000.

23. A process of claim 1, in which said hydrocarbon material is a polymeric olefin which is essentially aliphatic and has a molecular weight of at least about 3,000, said mixture contains at least about 1% of a polyalkenyl aryl hydrocarbon, and about 1% to about 80% by weight of an oxidizing agent selected from the class consisting of solid and liquid oxidizing agents.

24. A process of claim 23, in which said polymeric olefin is polyethylene, said aryl hydrocarbon is divinyl benzene, and said oxidizing agent is a finely divided perchlorate.

25. A propellant fuel composition of claim 2, in which said metal substance is boron.

26. A propellant fuel composition of claim 2, in which said metal substance is aluminum.

27. A propellant fuel composition of claim 2, in which said metal substance is magnesium.

28. A propellant fuel composition of claim 2, in which said metal substance is beryllium.

29. A propellant fuel composition of claim 2, in which said hydrocarbon material is a polymer having a molecular weight of at least about 3,000.

30. A propellant fuel composition of claim 2, in which said hydrocarbon material is a polymeric olefin having a molecular weight of at least about 3,000.

31. A propellant fuel composition of claim 2, in which said hydrocarbon material is a polymeric olefin which is essentially aliphatic and has a molecular weight of at least about 3,000.

32. A propellant fuel composition of claim 2, in which said hydrocarbon material is polyethylene of a molecular weight of at least about 3,000.

33. A propellant fuel composition of claim 2, in which said mixture is irradiated in intimate contact with at least about 1% by weight of a polyunsaturated modifier, based on the combined weight of said hydrocarbon material and said modifier.

34. A propellant fuel composition of claim 33, in which said modifier is essentially hydrocarbon.

35. A propellant fuel composition of claim 33, in which said modifier is a polyalkenyl aromatic hydrocarbon.

36. A propellant fuel composition of claim 33, in which said modifier is divinyl benzene.

37. A propellant fuel composition of claim 33, in which said hydrocarbon material is a polymeric olefin which is essentially aliphatic and has a molecular weight of at least about 3,000.

38. A propellant fuel composition of claim 33, in which said mixture also contains about 1% to about 80% by weight of an oxidizing agent selected from the class consisting of solid and liquid oxidizing agents.

39. A propellant fuel composition of claim 38, in which said oxidizing agent is a finely divided perchlorate.

40. A propellant fuel composition of claim 2, in which said hydrocarbon material is a polymeric olefin which is essentially aliphatic and has a molecular weight of at least about 3,000, said mixture containing at least about 1% of a dialkenyl aromatic hydrocarbon, and about 1% to about 80% by weight of a finely divided perchlorate.

41. A propellant fuel composition of claim 40, in which said mixture has been irradiated with at least about 5 megareps of ionizing radiation.

42. A process for propelling a rocket comprising the step of combusting an irradiated, metal-containing composition consisting essentially of at least one high molecular weight hydrocarbon material having a molecular weight of at least 300, containing at least 15 percent aliphatic portion therein, and having a plurality of repeating units therein having a formula selected from the class consisting of

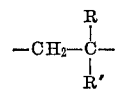

and

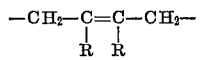

wherein R is selected from the class consisting of hydrogen and the methyl radical and R' is selected from the class consisting of hydrogen and aliphatic, cycloaliphatic and aromatic hydrocarbon radicals having no more than about 12 carbon atoms therein, in intimate mixture with a metal substance selected from the class consisting of boron, aluminum, beryllium and magnesium metals, their hydrides and derivatives of said hydrides in which each of the substituent groups of said derivatives is selected from the class consisting of aliphatic, aromatic and cycloaliphatic hydrocarbon groups, the metal content of said mixture being about 1 percent to about 70 percent by weight based on the combined weight of said high molecular weight material and said metal substance, the irradiation dosage being at least one megarep and not more than 100 megareps of high-energy, ionizing radiation equivalent to at least about 100,000 electron volts.

43. A process of claim 42 in which said mixture also contains substantially uniformly distributed therein during said irradiation a polyunsaturated modifier having a plurality of unsaturated groups therein selected from the class consisting of ethylenic and acetylenic groups and having no elements therein other than selected from the class consisting of carbon, hydrogen, oxygen, nitrogen, chlorine and fluorine, said oxygen being present only in the form of a group selected from the class consisting of ether, acetal, carboxylic ester, carboxylic acid, hydroxyl and amide groups, and said nitrogen being present only in the form of a group selected from the class consisting of amide, amine and cyano groups.

44. A process of claim 43, in which said polyunsaturated modifier is a dialkenyl benzene.

45. A process of claim 43, in which said polyunsaturated modifier is divinyl benzene.

46. A process of claim 43, in which said hydrocarbon material is polyethylene.

47. A process of claim 46, in which said polyunsaturated modifier is divinyl benzene.

References Cited

UNITED STATES PATENTS

| | | | |
|---|---|---|---|
| 2,796,411 | 6/1957 | Zirkle | 204—154 |
| 2,796,529 | 6/1957 | Morrison. | |
| 2,942,116 | 6/1960 | Axelrad | 204—193.36 |

FOREIGN PATENTS

| | | |
|---|---|---|
| 665,262 | 1/1952 | Great Britain. |

OTHER REFERENCES

Chem. and Eng. News, vol. 33, Nov. 21, 1955, pp. 5091–2.

Davidson et al., "Journal of Applied Physics," vol. 19, No. 5, May 1948, p. 427.

BEN F. PADGETT, Primary Examiner

U.S. Cl. X.R.

149—19, 22, 44, 87